United States Patent
Popat et al.

(10) Patent No.: US 6,824,839 B1
(45) Date of Patent: Nov. 30, 2004

(54) WATER-ACTIVATED POLYMERS AND ADHESIVE IMAGE TRANSFER TECHNIQUE

(75) Inventors: Ghanshyam H. Popat, Alta Loma, CA (US); Fred Miekka, Sierra Madre, CA (US); Raymond Kubit, Yorba Linda, CA (US); Robert Valadez, Azusa, CA (US); Gustav Ray, Huntington Beach, CA (US); Shiaonung Su, Buena Park, CA (US); H. Paul Barker, La Canada, CA (US)

(73) Assignee: Avery Dennison Corporation, Pasadena, CA (US)

(*) Notice: Subject to any disclaimer, the term of this patent is extended or adjusted under 35 U.S.C. 154(b) by 0 days.

(21) Appl. No.: 09/030,664

(22) Filed: Feb. 25, 1998

Related U.S. Application Data

(63) Continuation of application No. PCT/US96/13908, filed on Aug. 26, 1996, and a continuation-in-part of application No. 08/519,570, filed on Aug. 25, 1995, now abandoned.

(51) Int. Cl.[7] .............................................. B41M 5/00
(52) U.S. Cl. ................. 428/32.12; 347/105; 428/32.24; 428/32.25; 428/32.34
(58) Field of Search ................................ 428/195, 216, 428/318.4, 323, 327, 690, 32.1, 32.24, 32.12, 32.25, 32.34; 347/101, 105

(56) References Cited

U.S. PATENT DOCUMENTS

| | | |
|---|---|---|
| 3,441,430 A | 4/1969 | Peterson |
| 4,413,080 A | 11/1983 | Blake |
| 4,636,805 A | 1/1987 | Toganoh et al. |
| 4,732,786 A | 3/1988 | Patterson et al. |
| 4,812,541 A | 3/1989 | Mallya et al. |
| 4,832,984 A * | 5/1989 | Hasegawa et al. ........... 427/161 |
| 5,027,131 A | 6/1991 | Hasegawa et al. |
| 5,320,885 A | 6/1994 | Yamane et al. |
| 5,326,644 A | 7/1994 | Scholz et al. |
| 5,407,718 A | 4/1995 | Popat et al. |
| 5,501,902 A | 3/1996 | Kronzer |
| 5,640,180 A | 6/1997 | Hale et al. |
| 5,659,972 A | 8/1997 | Min et al. |
| 5,686,504 A | 11/1997 | Ang |
| 5,795,425 A | 8/1998 | Brault et al. |
| 5,984,467 A * | 11/1999 | Bodager et al. ............. 347/101 |

FOREIGN PATENT DOCUMENTS

| | | |
|---|---|---|
| EP | 64975 A1 | 4/1995 |
| EP | 775596 A1 | 5/1997 |
| EP | 782931 A1 | 7/1997 |
| JP | 06286325 | 10/1994 |
| JP | 09240196 | 9/1997 |
| WO | 9506564 | 3/1995 |
| WO | WO 96/26840 | 9/1996 |
| WO | 9707991 | 3/1997 |

* cited by examiner

Primary Examiner—B. Hamilton Hess
(74) Attorney, Agent, or Firm—Fulwider Patton Lee & Utecht, LLP

(57) ABSTRACT

An image transfer assembly (12) receives an image printed from an ink jet printer. The assembly (12) provides a device to transfer the printed image onto an image-receiving surface. The assembly (12) has a flexible substrate (16) on one side, and an upper surface (20) on the other side that is substantially permeable to ink jet printer ink and that is non-tacky prior to printing. The assembly (12) has an adhesive or polymer layer (14) in between the upper surface (20) and the flexible substrate (16). After printing with a water-based ink jet printer ink, the user may apply the assembly (12) to a substrate, such as a window or other surface, and remove the flexible substrate (16), thereby leaving the layer (14) that bears the image on the substrate. In one of several alternative embodiments, the layer (14) is divided into discrete zones that are separated from one another along boundaries.

31 Claims, 8 Drawing Sheets

WATER-ACTIVATED POLYMERS AND ADHESIVE IMAGE TRANSFER TECHNIQUE

RELATED APPLICATIONS

This is a continuation-in-part of U.S. patent application Ser. No. 08/519,570, filed Aug. 25, 1995 now abandoned, which this application incorporates by reference, and is related to a U.S. continuation-in-part patent application by the same title that is to be filed concurrently herewith. This is a continuation of International application PCT/US96/13908, filed Aug. 26, 1996.

FIELD OF THE INVENTION

This invention relates to materials which are ink jet imprintable and that can be used for adhesive image transfer, and constructions made with such materials.

BACKGROUND OF THE INVENTION

Labels, tapes and similar constructions are ubiquitous in modern society. Many such constructions include a release liner coated with an adhesive, such as a pressure-sensitive adhesive (PSA), which is laminated to a paper or film face stock. Removal of the release liner allows the construction to be adhered to a substrate. The face stock and liner are a major cost of the label.

Many adhesives, such as those commonly used in label constructions, are not water dispersible or repulpable. Therefore, they make recycling of the label product difficult, due to the tendency of the adhesives to form globules during the repulping process. In addition, most PSAs are tacky when dry and cannot readily be used with ink jet printers that have become so popular in today's world. Moreover, such PSAs typically are not hydrophilic, making it difficult to directly print on them directly with water-based ink jet printer inks. Instead, only the face stock or liner is ink receptive. The unsuitability of such PSAs for use in ink jet printers is compounded by the tendency of the adhesives to block the printer ports in the printers.

Although attempts have been made to formulate moisture activated or water activated adhesives, many of the adhesives produced have been rubber based and, therefore, subject to oxidative and UV degradation. Other adhesives have been solvent borne, and thus objectionable for environmental, health and safety reasons. The following patents are representative. U.S. Pat. No. 3,681,179 to Theissen discloses a solar control film construction having a water-activatable adhesive system comprising a normally tacky and pressure-sensitive adhesive coating covered by a thin, tack-free continuous water-soluble layer. A tack free emulsion acrylic adhesive is not disclosed.

European Pat. Nos. 199,468 and 297,451 describe a method for compounding water-activatable hot melt adhesives comprising polyaklylenimine or other vinyl heterocyclic monomers, a hydroxy-substituted organic compound, a plastizier, tackifier, and filler, and an antioxidant. No mention is made of making water activatable emulsion acrylic adhesives.

U.S. Pat. Nos. 4,331,576 and 4,325,581 to Colon et al. disclose common water-soluble hot melt adhesives based on polymers containing vinyl pyrrolidone and other heterocyclic monomers. Emulsion acrylics are not disclosed.

U.S. Pat. No. 4,052,368 to Morrison and U.S. Pat. No. 4,172,824 to Harrington describe water sensitive hot melt adhesives including polyester-based adhesives which typically comprise a copolyester in combination with a plasticizier. The systems are not emulsion acrylics.

None of the above-identified patents disclose or suggest the possibility of making a hydrophilic, acrylic emulsion polymer that is non-tacky when dry and water activated to become an adhesive, and that can be used in a "label-less" or "liner-less" construction, i.e., a construction in which either a face stock or liner is not required Many arrangements for the transfer of images from ink jet printers are known. For example, images, including printing, may be printed onto labels having pressure sensitive adhesive on the labels, and these labels may be applied to a desired substrate, such as a bottle or other product.

SUMMARY OF THE INVENTION

In accordance with the present invention, it has been determined that some unique benefits may be obtained by imaging onto a polymer layer, coated on an opaque or transparent plastic sheet, such as MYLAR™, as a base layer, using an ink jet printer.

A conventional ink jet printer is employed to apply an ink image, preferably a colored image, to the adhesive layer of an image transfer sheet, the adhesive layer having been coated onto a base layer which is preferably flexible and nonporous to an ink jet printer ink. The non-porous flexible layer may be a sheet of plastic which can be either opaque or transparent.

The adhesive layer is compatible with and will absorb an ink jet printing ink. Most inks used in ink jet printers are water based, but such inks may also be based on organic solvents or carriers for the ink dyes and/or pigments. Thus, depending upon the ink used in the ink jet printer, the adhesive layer may be either hydrophilic or hydrophobic. Since, as noted above, most ink jet printing inks are water based, it is generally preferable if the adhesive coating or layer, at the time of imaging, is hydrophilic and will absorb the water-based ink.

Water-based inks for ink jet printers are well-known in the art and therefore no detailed exemplification thereof will be given herein. These water-based inks contain a sufficient amount of water to be the carrier for the dyes and/or pigments in the ink. Of course, a water-based ink jet printing ink may contain water-miscible organic liquids such as polyhydric alcohols which are often present in water-based inks to prevent clogging of the nozzles. The inks may also contain a variety of other compounds such as surfactants, etc.

At the time of printing the ink on and into the adhesive layer to form an image, the adhesive layer should be detackified. After the adhesive layer is imaged, it will then be activated, i.e. the adhesive layer tackified to a tacky state, and adhered or bonded to any desired substrate such as a ring binder, clothing, notebook cover, a glass window, a wall or anywhere it is desired to view the image. In this regard, it should be noted that if the image is placed or adhered to a non-transparent substrate, and the base layer is not transparent, the adhesive layer should be releasably bonded to the base layer so that the base layer can be removed to allow the image to be seen by a viewer. From the foregoing, it is apparent that the image is viewable from both the lower surface (i.e. the surface facing the base layer) and the upper surface (i.e. the surface facing away from the base layer) of the adhesive coating or layer.

The ink absorbing adhesive layer used in the present invention may be pressure sensitive, particularly hydrophilic pressure sensitive adhesives. Such adhesives are known in the art and include repulpable pressure sensitive adhesives such as those disclosed in U.S. Pat. Nos. 5,196,504 and 5,326,644, such disclosures being incorporated herein by reference. The adhesives disclosed in these patents are water-dispersible and tacky at room temperature which make them ideal for use in the present invention. Of course, other pressure sensitive hydrophilic adhesives are also known in the art and they too are suited for use in the present invention.

If an adhesive is used which is tacky at the time when it is imaged, the adhesive may be detackified by providing the imaging transfer sheet with an outer detackifying layer over the upper surface of the adhesive coating. Such a detackifying layer will be porous to the imaging ink so that a sufficient amount of ink will pass through the porous detackifying layer to the adhesive layer to allow an image to be formed therein. Generally speaking, the detackifying layer will permit at least 30 percent and preferably more (e.g. 40 percent) of the ink jet printing ink to pass into the adhesive layer and form an image.

Various types of porous detackifying layers may be used. For example, a mesh coating such as cheesecloth may be used, preferably with a very thin layer of release material such as silicone between the mesh layer and the adhesive, preferably coated on the mesh before it is applied to the adhesive so that the mesh layer may be more readily removed. It is emphasized that the silicone layer does not cover the pores of the mesh, thereby allowing the ink to pass through the pores of the mesh and into the pressure sensitive adhesive. Other mesh materials having finer strains and being less coarse than cheesecloth may be employed. Even paper may be employed since it is porous to the ink.

Other porous detackifying outer layers which are useful in the present invention may be formed from finely divided particles uniformly dispersed on and bonded to the surface of the tacky adhesive layer. Examples of such particles are cellulose particles and dextrin particles. It is particularly preferred if the finely divided particles have the shape of round spheres as is the case with starch particles (e.g. corn or potato starch) and powdered polyvinyl alcohol. Such porous layers are advantageous used with a pressure sensitive adhesive which, when heated, becomes sufficiently fluid that when pressure is applied the particles are dispersed into the adhesive layer, thus allowing the tacky adhesive layer to contact and adhere to a suitable substrate. If the finely divided particles have substantially the same refractive index as the adhesive layer (e.g. starch particles and polyvinyl alcohol particles), the particles are not seen by a viewer and thus seem to disappear. Exemplary of pressure sensitive adhesives which are well suited for use with the finely divided particles are repulpable adhesives as described in the patents cited above. It should be noted that powdered vinyl alcohol (whether in the form of round spheres or not) is normally not tacky when dry, but is permeable to water so that the ink jet image is readily absorbed into the PVA coated pressure sensitive adhesive. Where this detackifying coating is used, it is desirable to wet or at least dampen the substrate to which the image is subsequently applied, or the PVA surface, and this serves to activate the adhesive and have the PVA combine therewith.

It is also noted that a release layer may be employed between the adhesive and the non-porous, flexible, preferably transparent, backing sheet, so that the backing sheet may be removed. When a hydrophilic adhesive is used and the image sheet is adhered to a window, for example, it may be washed off by first removing the transparent plastic sheet and then washing with soap and water in a normal manner.

In some other cases, it may also be desirable remove the transparent plastic layer, which may be MYLAR™, for example, so that the image in the adhesive appears brighter; and an additional transparent detackifying layer, which may be polyvinyl alcohol, may be used between the release layer and the pressure sensitive adhesive to eliminate the surface stickiness or tackiness of the adhesive, which would otherwise be directly exposed. The detackifying layer need not be transparent, however, and may include fine metallic flakes, phosphorescent material, fluorescent material, fabric, leather, and/or other materials. The additional layer could also provide water proofing if comprised of urethane, varnish, or other water resistant material.

It is also noted that the pressure sensitive adhesive layer may be a delayed action, heat activated pressure sensitive adhesive wherein the pressure sensitive adhesive properties arise following heating and have a predetermined open tack time for adhering to surfaces, and then become non-tacky. When such a pressure sensitive layer is employed, a detackifying layer would not be needed. Examples of such adhesives include acrylates and ethylene vinyl acetate.

In accordance with another aspect of the invention, the upper layer of the image sheet may be a water activatable adhesive. In further accordance with the present invention, there are provided hydrophilic, repulpable, acrylic polymers which are non-tacky when dry but become tacky when wet, and which exhibit high peel strength and excellent adhesion to a diverse array of substrates, including paper, polymer films, and highly polar substrates such as stainless steel and glass. In one embodiment of the invention, the composition comprises an acrylic-based polymer prepared by emulsion polymerization of a monomer mixture comprising, based on the total weight of monomers, from about 40 to about 70% by weight of one or more alkyl acrylates, the alkyl group of which has from 4 to about 8 carbon atoms; from about 10 to about 20% by weight of methyl acrylate; from about 2 to about 15% by weight of vinyl acetate; from about 10 to about 25% by weight of methacrylic acid and/or acrylic acid and a positive amount up to about 30% by weight, of methyl methacrylate. In another embodiment, the monomer mixture additionally contains a positive amount, up to about 5% by weight, of a short chain hydroxyalkyl methacrylate, such as hydroxyethyl methacrylate. Unexpectedly, the presence of methyl methacrylate appears to enhance the "clean break" between water-activated regions of the polymer layer and non-activated regions, a phenomenon described below.

The acrylic emulsion polymers of the present invention have a relatively high glass transition temperature ($T_g$)—as high as about 40° C., for some formulations—and a weight average molecular weight of from about 100,000 to about 200,000. Because of their high glass transition temperatures, the polymers are not tacky at room temperature, when dry. But the polymers are highly polar and, when exposed to moisture, such as the water in an aqueous ink jet printer ink, they become tacky, The polymers are hydrophilic and repulpable, water-activatable and transparent to visible light. They may be directly printed upon using, a water-based ink, and after activation and adhesion to a substrate can be removed from a substrate by application of water. They are particularly useful as ink jet-imprintable polymers converted into adhesives used in a variety of constructions, including "label-less" or "liner-less" labels, security films, solar control films, beverage labels (where it is desirable to have a transparent label on a clear bottle), decorative adhesive image sheets, and the like.

This adhesive may be coated onto the flexible base layer, with an intermediate release coating, if desired. The resulting image transfer sheet is non-tacky when dry. However, the upper adhesive layer is hydrophilic, and will absorb an image from a conventional ink jet printer. Upon printing with the ink jet printer, the solvent present in the inks penetrates the mixture of PCA and polyacrylic acid causing the mixture to become tacky again, where the ink has been printed. The areas where ink has been printed will remain tacky until the ink solvent has evaporated. It is desirable to apply the image to the substrate while the printed areas are still tacky because once the ink has evaporated, the image sheet will again become non-tacky. However, if the ink dries, either the image sheet or the substrate, such as a window, may be sprayed or dampened with water to activate the adhesive so that the image sheet will adhere to the substrate.

In accordance with an improved embodiment of the present invention, an assembly for transferring ink-jet printed images has an adhesive layer in between a non-tack upper surface and a flexible substrate. The adhesive layer has discrete zones separated from one another along boundaries. The adhesive layer may either be printed in small dots, or may be printed as a continuous layer and then scored to form the discrete zones.

The user first prints an image onto the assembly with an ink jet printer, then places the upper layer of the assembly against an image-receiving surface. The user peels the assembly back from the image-receiving surface, thereby leaving the image on the image-receiving surface. The zones of adhesive into which ink jet printer ink has not been printed remain adhered to the flexible substrate, while the ink-bearing zones of adhesive attach to the image-receiving surface. This allows the image to break cleanly from the image sheet, which otherwise is prohibited by the cohesion of the acrylic adhesive layer.

In another aspect of the invention, an ink jet-imprintable, water-activated adhesive construction is provided. In one embodiment, the construction comprises a layer of water-activatable acrylic polymer, coated on a flexible substrate, which in some embodiments is a release liner, such as an inherently releasable film or a paper or film backing coated with a silicone or other release material. The water-activatable layer is non-tacky when dry, but becomes tacky when exposed to water. Consequently, when printed with a water-based ink jet printer ink, the polymer layer becomes tacky within the region of the printed image, but not in regions not printed on. When applied to a substrate, this allows a clean break between imaged (printed) and unimage (unprinted) regions of the adhesive, and the ability to form a "label-less label."

The construction is useful as a label or decorative image sheet, and is applied to an object or surface by adhering the water-activated polymer (which is now tacky) to the object and, optionally, removing the flexible substrate. In one embodiment, the construction includes a water insoluble, transparent film layer, preferably of a polymeric material, disposed between the water-activatable polymer and a release liner. Alternately, the water insoluble layer is used in place of the release liner, as a flexible substrate.

Other objects, features and advantages of the invention will become apparent from a consideration of the following detailed description and from the accompanying drawings.

DETAILED DESCRIPTION OF THE PREFERRED EMBODIMENTS

Figure 1:
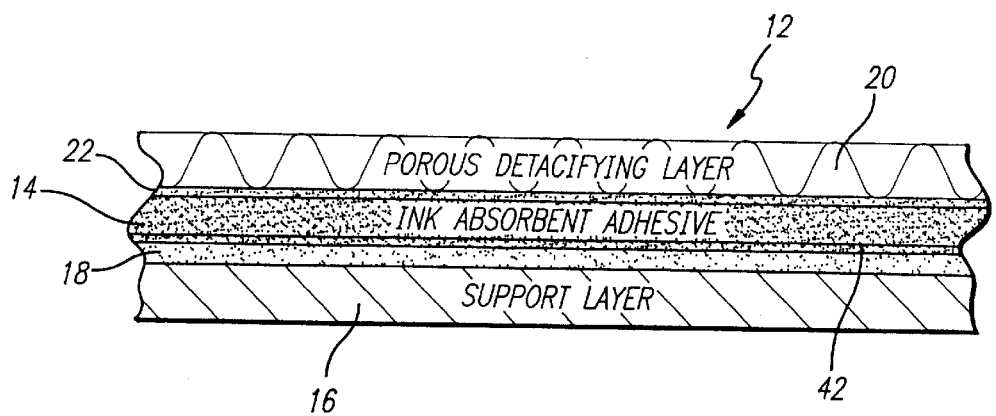
FIG. 1 is a schematic cross-sectional view of an imaging sheet illustrating the principles of the present invention.

Referring now to the drawings, FIG. 1 is a cross sectional view of an imaging sheet 12 in which the image is held in an ink absorbent pressure sensitive adhesive layer 14. The imaging sheet 12 may be provided with a support layer 16 which is preferably transparent and may be formed of a plastic material such MYLAR™. The Mylar™ layer 16 may, for example, have a thickness of between about one-half of one thousandth of an inch to about 0.003 inch. Coated on the support layer 16 is a release layer 18 which is normally a material such as silicone, having a thickness of about 1/10 of a mil, or about 0.0001 inch. An optional detackifying layer 42 such as polyvinyl alcohol may be provided, having a thickness of about from 0.05 to 1.5 mils. The pressure sensitive adhesive layer 14 may, for example, have a thickness of between ½ and 2 mils. A detackifying layer 20 is provided at the upper surface of the imaging sheet 12, and this layer may be a porous screen material, such as a cheese cloth, or a fine open mesh. To facilitate removal of the porous layer 20, it may be sprayed with a release coating 22 prior to its application to form the complete composite imaging sheet 12. The mesh screen may, for example, be from 1 to 5 mils thick, and the release layer may, again, be formed of silicone and is a very thin coating in the order of one ten thousandth of an inch in thickness.

Figure 2:
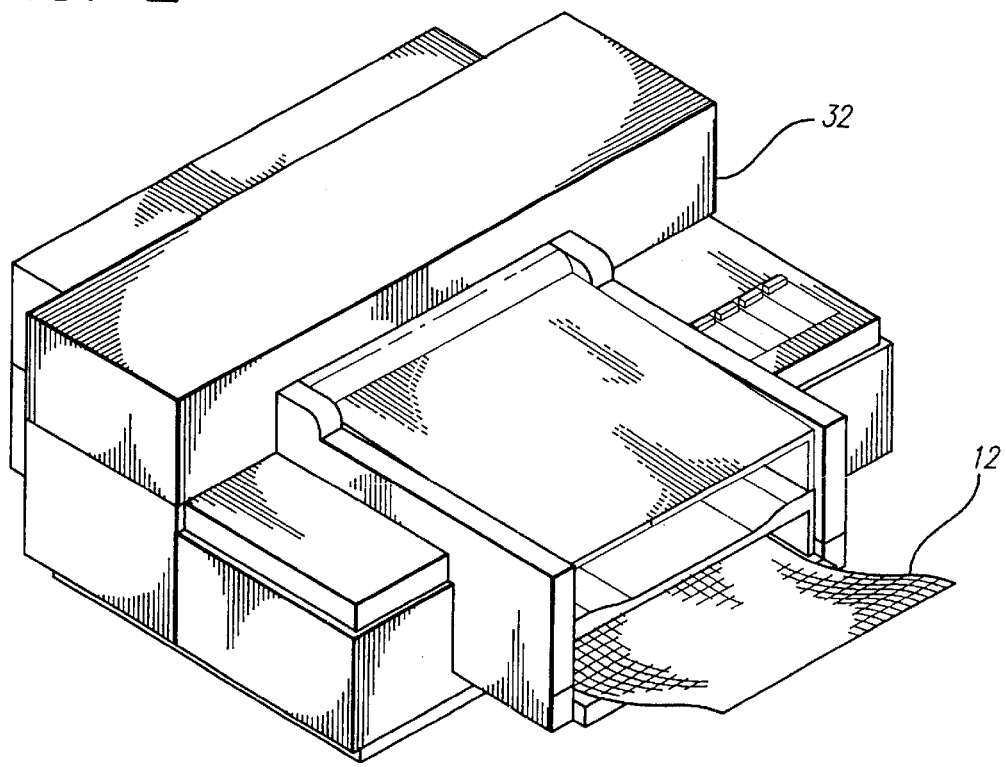
FIG. 2 shows an ink jet printer receiving an imaging sheet of the type shown in FIG. 1.

FIG. 2 of the drawings shows a conventional ink jet printer 32 through which the composite imaging sheet 12 is being fed. Incidentally, the mesh as shown in FIG. 2 on the imaging sheet 12 is shown as being much coarser than the mesh or screen would actually be in practice. For example, the mesh or screen could have transverse threads spaced in the order of a thousandth or a few thousandths of an inch apart in each direction, rather than the very coarse mesh as shown in FIG. 2.

Figure 3:
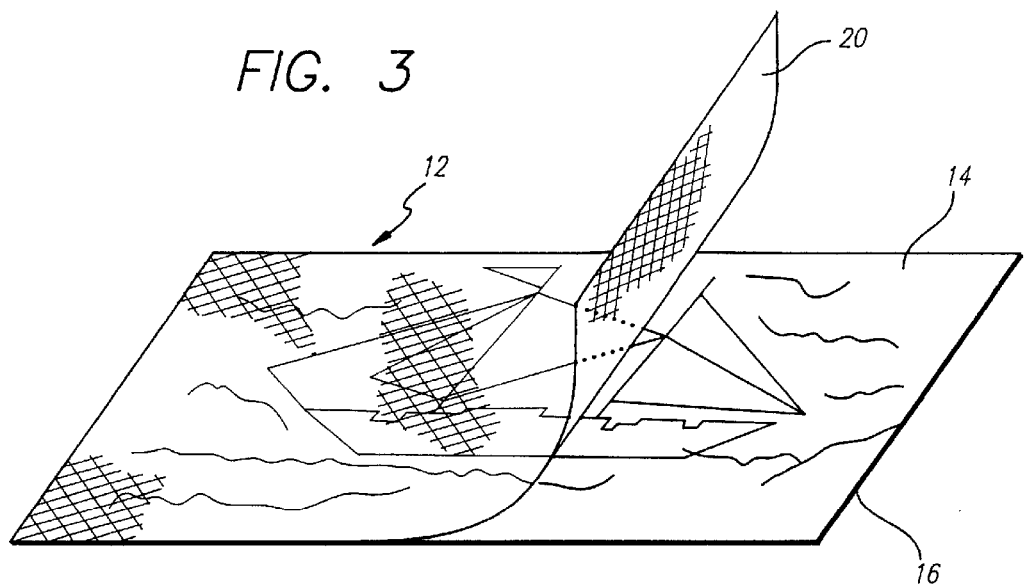
FIG. 3 shows a sheet illustrating the principles of the invention in which a porous screen is being removed.

Referring now to FIG. 3 of the drawings, the mesh 20 is in the process of being removed, and the imaged pressure sensitive adhesive layer 14 will then be on the upper surface of the sheet 12. The adhesive layer 14 will still be supported by the underlying plastic sheet, as indicated by the reference numeral 16.

Figure 4:
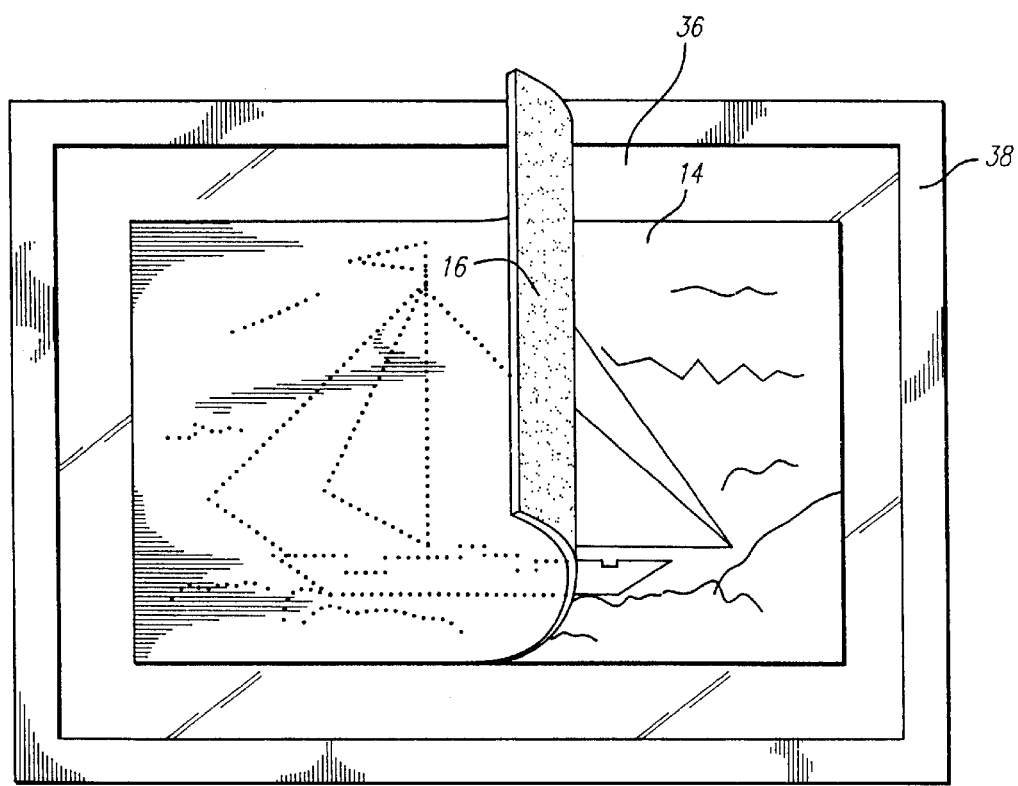
FIG. 4 shows the image sheet of FIG. 3 mounted on a transparent substrate, such as a window, and in the process of having the support layer peeled off.

FIG. 4 is a schematic showing of the pressure-sensitive adhesive layer 14 mounted on a sheet of glass 36 shown in a frame 38 which could, for example, be a window frame in which the sheet of glass 36 is mounted. In FIG. 4, the transparent sheet 16 is shown being removed. In this regard, it is noted that the image in the pressure-sensitive adhesive layer 14 is clearly visible from the other side of the glass, but is less clear when it has to be viewed through the MYLAR™ layer 16. Accordingly, in order to more clearly view the image in the layer 14, the protective substrate or transparent plastic layer 16 may be removed, once the sheet has been adhered to the glass 36. In addition, following the removal of the layer 16, which may serve as a protection against moisture for the hydrophilic layer 14, the entire window may be readily washed clean with soap and water.

Incidentally, following removal of the protective layer 16, it is sometimes preferred that the pressure sensitive adhesive layer 14 not be sticky, or tacky. Accordingly, as shown in FIG. 1, an additional detackifying layer 42 may be provided. This detackifying layer may, for example, be polyvinyl alcohol. This layer could also include fine metallic flakes, or phosphorescent material, or fluorescent material, or fabric, or leather, etc. so that the end user could simply print an image to be transferred and then, upon transferring the image, the detackifying layer (comprised of the previously mentioned materials) would now be the only layer visible to the user. This allows the end user to expand the use of a typical ink jet printer, from two dimensional visual representations in inks, to visual representations in the previously mentioned substances. The additional layer could also provide water proofing if comprised of urethane, varnish, or other water resistant material. With this layer in place, when the base layer 16, as shown in FIG. 4, is removed, the image bearing: pressure-sensitive layer 14 will not be directly exposed, and therefore will not feel tacky.

Figure 6:
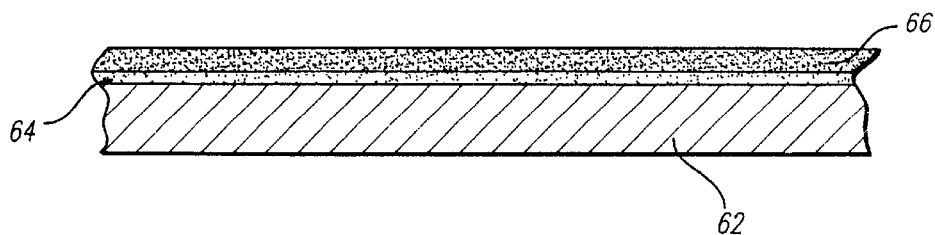
FIG. 6 shows an embodiment of the invention in which a water activated adhesive imaging layer is employed.

As an alternative to the use of pressure sensitive material having normal, fairly long lasting adhesive properties, a delayed action heat activated pressure sensitive adhesive may be employed. One such adhesive is available from the Nashua Company of Nashua, N.H. under the trade designation number BM-4. Inks for use with this adhesive should have a polar solvent or carrier, such as methylethyl ketone. Such adhesives are heat activated and have an open sealing or adhesive time period during which they may be applied to a substrate, and thereafter they become non-tacky. When such adhesives are used, the additional detackifying layer 42 is not needed, and a simplified overall construction as shown in FIG. 6 may be used.

Concerning the various layers of FIG. 1, the basic components of the sheet 12 include the support layer 16, the ink absorbing pressure-sensitive adhesive layer 14, and a detackifying layer 20. Concerning the release layer 18 and the detackifying layer 42, these will not be included in the sheet in the event that it is not desired to remove the transparent support layer 17. In addition, in some cases, the release layer 22 may not be needed, when the mesh can be peeled off the adhesive layer without release layer 22, or when a different type of detackifying layer, as disclosed hereinbelow, is employed.

Also, instead of a hydrophilic adhesive for the pressure-sensitive adhesive layer 14, other types of pressure-sensitive adhesives may be employed for use in connection with an organic solvent based ink, which will be absorbed by, and permit an image to penetrate the particular pressure-sensitive adhesive which is used.

For specific examples, solvent cast acrylic pressure sensitive adhesives or hot melt pressure sensitive acrylic adhesives may be used. For such adhesives, inks having relatively polar solvents such as normal butyl alcohol or methylethyl ketone are preferred. Rubber based pressure sensitive adhesive such as Avery S-246 may be employed with inks in relatively low polarity solvents such as heptane or toluene.

Figure 5:
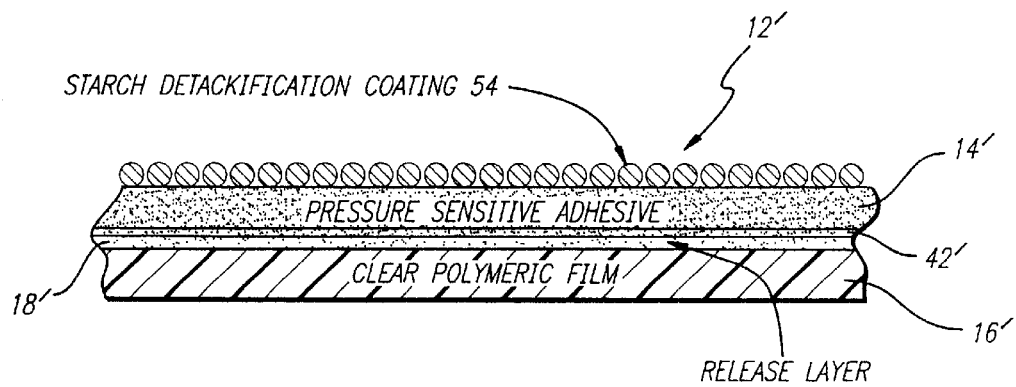
FIG. 5 shows a further embodiment of the invention in which a coating of starch is employed as the detackification coating.

Referring now to FIG. 5 of the drawings, FIG. 5 shows a sheet 12'. In FIG. 5, the base or support layer 16', the release layer 18', the detackifying layer 42', and the ink absorbing pressure sensitive adhesive layer 14' are as described hereinabove.

However, instead of a mesh type detackifying layer at the upper surface, FIG. 5 discloses the use of starch particles as the detackifying coating 54. When a starch detackifying layer 54 is employed, the ink solvent causes the starch particles to dissolve and intermix with the underlying adhesive layer. The result is that only the area where the ink jet image has been printed becomes tacky. The rest of the sheet remains non-tacky and does not transfer. However, heat and pressure can also be employed to combine the starch layer with the adhesive and therefore activate the adhesive layer 14' so that it is tacky and will stick to whatever surface is employed. As noted previously, the starch particles have substantially the same refractive index as the adhesive and therefore when combined with (dispersed in) the adhesive the particles cannot be seen.

Referring again to FIG. 1 of the drawings, the detackifying layer may be a very thin layer of polyvinyl alcohol (PVA), preferably a fraction of thousandth of an inch thick, or even about 0.0001 inch thick, or about 2 grams/m$^2$. PVA is non-tacky when dry, but is hydrophilic so that an applied ink jet image will penetrate through to the underlying hydrophilic adhesive layer. Printing of the ink jet ink causes the PVA layer and the underlying adhesive layer to intermix, allowing only the printed image to become tacky. As the image sheet is applied to a substrate the substrate or the image sheet is dampened, the PVA further combines with the pressure sensitive adhesive and a good adhesive bond is obtained between the imaged pressure sensitive adhesive and the substrate.

Now, turning to FIG. 6 of the drawings, a relatively simple embodiment of the invention includes the base layer 62, a thin release coating 64, and a water activatable adhesive layer 66. Layer 66 may be a few thousandths of an inch thick, for example, 0.002 to 0.005 inch thick. The water activated adhesive layer 66 may be formed of polyvinyl alcohol (PVA) and polyacrylic acid. It may be applied as an aqueous solution including about 10 percent solids, with approximately 75% PVA and 25% polyacrylic acid. The coating is non-tacky when dry. However, it is hydrophilic, and accepts a good image from an ink-jet printer. Following imaging the image sheet may, for example, be adhered to a substrate, such as a window which has been sprayed with water, so that when the image sheet is applied to the wet window the adhesive is activated, and the image sheet is adhered to the window. Thereafter, the base layer may be peeled off, leaving the imaged adhesive layer on the substrate.

The present invention provides acrylic polymers that are non-tacky when dry, hydrophilic, water repulpable, and water activatable to become tacky—even by a small amount of moisture. When activated by water, the polymers become tacky. When applied to a substrate, the activated adhesives exhibit high peel strength, yet are removable by further application of water. Advantageously, the adhesives are ink jet imprintable, as well as transparent to visible light.

In one embodiment of the invention, the activatable composition comprises an emulsion polymer formed from a monomer mixture comprising, based on the total weight of monomers, (a) from about 40 to about 70% by weight of at least one alkyl acrylate, the alkyl group of which has from 4 to about 8 carbon atoms; (b) from about 10 to about 20% by weight of methyl acrylate; (c) from about 2 to about 15% by weight of vinyl acetate; (d) from about 10 to about 25% by weight of methacrylic acid, acrylic acid, or a mixture of methacrylic and acrylic acid; and (e) a positive amount—up to about 30% by weight based on the total weight of monomers—of methyl methacrylate. In another embodiment, the monomer mixture further comprises (f) a positive amount—up to about 5% by weight—of a short chain hydroxyalkyl methacrylate. Both embodiments are highly polar, and the polymers are hydrophilic.

The identity and relative amounts of monomers used to form the polymers are selected such that the polymer has a high enough glass transition temperature $T_g$, and/or other properties (e.g., high plateau modulus) that the polymer is non-tacky at room temperature, when dry. To that end, it is preferred to maximize the relative amounts of methyl methacrylate, vinyl acetate, and/or the acid monomers, relative to the amount of alkyl acrylate(s) used.

Thus, in one preferred embodiment, the monomer mixture includes at least 5%, preferably 10%, by weight of methyl methacrylate, and the polymer $T_g$ can be as high as about 40° C. In another embodiment, as much as 20%, or even 30% by weight of methyl methacrylates is included, in order to increase polymer $T_g$ and improve the "clean break" feature of the water-activated adhesives. In other embodiments, however, the amount of methyl methacrylate may be much lower—as well as even 0.1% by weight—and $T^g$ of the polymer is raised through the effect of other monomers.

It is also preferred to employ a mixture of alkyl acrylates as the first monomeric component. Useful alkyl acrylates include n-butyl acrylate, 2-ethylhexyl acrylate, isooctyl acrylate, and the like. A mixture of 2-ethylhexyl acrylate and butyl acrylate is preferred. Similarly, it is preferred to employ a mixture of acrylic and methacrylic acid as the fourth monomeric component of the polymer.

In those embodiments where a hydroxyalkyl methacrylate monomer is employed, the monomer has a short chain alkyl group containing from 2 to about 6 carbon atoms, with hydroxyethyl methacrylate (HEMA) being preferred. The amount of HEMA that can be employed is limited by its effect on viscosity and pre-emulsion stability. In general, its concentration is kept below about 5%, more preferably about 4%, based on the total weight of monomers.

The acrylic polymers of the present invention are prepared in a conventional manner, using unreactive surfactants or, more preferably, a mixture of unreactive and reactive surfactants, the latter copolymerizing with the monomers and becoming part of the emulsion polymer. Representative conventional surfactants include anionic surfactants such as Polystep B-27, an aqueous solution of the sodium salt of nonylphenoxy polyethyleneoxyethanol sulfate, available from Stepan Company (located in Winnetka, Ill.); nonionic surfactants such as AR 150, a nonionic ethyleneoxide adduct of pale wood rosin, available from Hercules, Inc. (located in Wilmington, Del.); and mixed anionic/nonionic surfactants, such as Polystep J-927, a mixture of Polystep B-27 and Polystep F-9 (nonylphenol ethoxylate), also sold by Stepan Chemicals. Up to about 10% by weight of surfactants is typically added. Good repulpability has been obtained with 8% surfactants, as measured by TAPPI UM 213.

Preferred reactive surfactants are anionic vinyl functional surfactants, such as sodium vinyl sulfonate and sodium styrene sulfonate. Reactive surfactants tend to enhance cohesive strength of the resulting copolymer, and aid in the copolymerization process. When used, reactive surfactants are typically employed in an amount of between about 0.5% and 1.5% by weight, preferably about 1%, based on the total weight of monomers.

Polymerization initiators or catalysts are advantageously added to speed the copolymerization of the monomers. Useful polymerization initiators include, without limitation, tert-butyl hydroperoxide (t-BHP) and potassium persulfate (KPS). In some embodiments, a molecular weight regulator is added to the monomer mixture to control average polymer chain length. Useful regulators include n-dodecyl mercaptan (n-DDM) and similar compounds. Other agents and additives can be added to facilitate more efficient, controlled emulsion polymerization, including oxidants such as hydrogen peroxide and iron ethylenediaminetetraacetic acid (Fe EDTA), reducing agents such as sodium formaldehyde sulfoxylate (available from Henkel Company), and post-polymerization agents such as ascorbic acid. Ascorbic acid forms a redox system with t-BHP (which is an oxidant), and facilitates removal of residual monomers after polymerization). Before filtering the reaction mixture, a biocide, such as Kathon LX (available as a 1.5% solution from Rohm & Haas) can be added to prevent bacterial growth.

The emulsion polymers are prepared with excellent conversions at a reaction temperature of around 70° C., in the presence of from about 0.5 to about 1% by weight, based on the weight of the monomers, of a persulfate or equivalent catalyst, with the monomer mixture being fed over a period of about 2–4 hours. Reaction pH preferably is regulated by addition of sodium bicarbonate, or similar agents, to within a range of from about 4.0 to about 6.0.

While actual production techniques may vary depending upon particular monomer compositions, available equipment, and other considerations, in general, the emulsion polymers are prepared by first mixing one or more pre-emulsions containing conventional surfactants, sodium bicarbonate, and some or all of the monomers in deionized water; adding reactive surfactants and other reactor ingredients (e.g., Fe EDTA, AR 150, hydrogen peroxide) to a reactor under nitrogen; heating the reactor to 70° C.±2° C. and then adding a pre-emulsion charge, over time (preferably in stepped or mixed feed sequences); adding an initiator charge containing, for example, potassium persulfate; continuing the pre-emulsion feeds and addition of any accelerators; adding any post-reaction charges (e.g., t-BHP, ascorbic acid, and more water); cooling the reactor contents to below 35° C. adding the biocide; and filtering the emulsion polymer.

Using the emulsion polymerization techniques described above, several exemplary embodiments of the present invention were prepared. The monomeric compositions of the emulsion polymers are presented in Table I. Examples 1A–1H contain alkyl acrylates, methyl acrylate, vinyl acetate, a mixture of methacrylic acid and acrylic acid, and methyl methacrylate. Example 2 additionally contains hydroxyethyl methacrylate. Pilot scale-up of Example 1E yielded an emulsion PSA polymer with a solids content of about 58%, a viscosity of about 200 cps, and a pH of about 5.5. One percent by weight of n-DDM was used as a chain transfer agent in a pre-emulsion used to prepare the polymer.

TABLE I

Monomeric Composition of Emulsion Acrylic Polymers (% by wt., rounded)

| MONOMER | 1A | 1B | 1C | 1D | 1E | 1F | 1G | 1H | 2 |
|---|---|---|---|---|---|---|---|---|---|
| Butyl acrylate | 22 | 24 | 23 | 24 | 24 | 26 | 24 | 24 | 24 |
| 2-Ethylhexyl acrylate | 40 | 38 | 36 | 36 | 36 | 22 | 21 | 16 | 16 |
| Methyl acrylate | 14 | 15 | 14 | 15 | 15 | 16 | 14 | 15 | 15 |
| Vinyl acetate | 6 | 6 | 6 | 6 | 6 | 7 | 6 | 7 | 6 |
| Methacrylic acid | 9 | 8 | 9 | 10 | 10 | 10 | 9 | 10 | 9 |
| Acrylic acid | 5 | 5 | 7 | — | 0.4 | 1 | 1 | 1 | 2 |
| Methyl methacrylate | 2 | 4 | 4 | 10 | 10 | 18 | 25 | 28 | 28 |
| Hydroxyethyl methacrylate | — | — | — | — | — | — | — | — | 2 |

Using standard Pressure-Sensitive Tape Council (PSTC) test procedures, 90° peel, loop tack and shear were measured for Example 2F, (after activation with water), applied at a coat weight of 20 grams per square meter. Static shear from stainless steel was measured using a ½"×½" test area on longer test strips. 90° peel and loop tack were measured from stainless steel, high density polyethylene (HDPE), glass, and corrugated board surfaces. The results are presented in Table II, where the observed adhesion failure modes—face stock failure (FS) and panel failure (P)—are given in parentheses.

TABLE II

Peel, Tack and Shear Data for Ex. 1E After Water Activation

| | 90° Peel (lbs/in.) After 20 min. Dwell | 90° Peel (lbs/in.) After 24 hr. Dwell | Loop Tack (lbs/in.) | Shear from Stainless Steel (minutes) |
|---|---|---|---|---|
| Stainless Steel | 0.32 (FS) | 0.55 (FS) | 0.03 (P) | >20,000 |
| HDPE | 0.05 (P) | 0.03 (P) | 0.05 (P) | NA |
| Glass | 0.23 (FS) | 0.08 (P) | 0.07 (P) | NA |
| Corrugated board | 0.05 (P) | 0.03 (P) | NA | NA |

Figure 7:
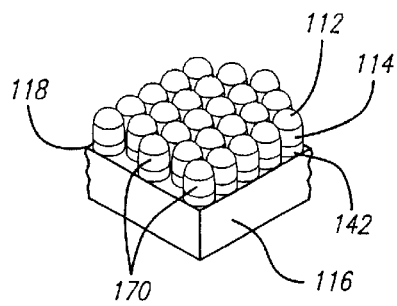
FIG. 7 shows an alternative embodiment of the present invention having a plurality of discrete zones defined by printed dots.

An alternative class of embodiments utilizes an adhesive layer that is subdivided into individual zones that can be removed from the release coated backing sheet independently of one another. FIG. 7 illustrates one such embodiment, which is constructed as follows. A substrate 116 is coated with a release coating 118. A thin layer of PVOH 142 is set down on the release-coated substrate 116 in small dots or zones 170 and is dried. Then, a layer of emulsion adhesive 114 is applied to the PVOH layer 142 in small dots and dried. Finally, an outer layer of PVOH 112 is applied to the adhesive layer 114 in dots and dried.

The outer layer of PVOH 112 provides a non-tack outer surface to prevent the assembly from sticking to the interior of the ink-jet printer during printing. The outer layer of PVOH 112 should be very thin, to ensure that as much ink as possible passes through the PVOH layer during printing, while still maintaining a non-tack outer surface.

The dots of adhesive and PVOH can be printed with a process employing a Gravure wheel, in which dots have been etched. It is known in the art to print lines of adhesive using a Gravure wheel into which lines have been etched. To print dots rather than lines, dots are etched into the Gravure wheel rather than lines.

Figure 8:
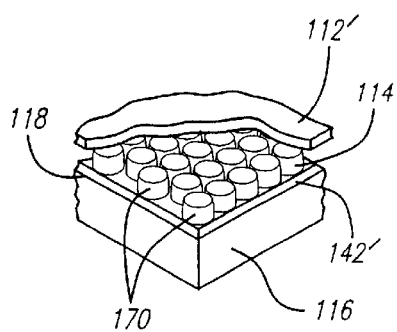
FIG. 8 shows an alternative embodiment similar to the embodiment of FIG. 7, except that the upper and lower layers are continuous.

FIG. 8 is one presently preferred embodiment having a substrate 116 that is coated with a release coating 118. A thin, continuous layer of PVOH 142' is set down on the release-coated substrate 116 and is then dried. Next, a layer of emulsion adhesive 114 is applied to the PVOH layer in small dots, preferably smaller than 1 millimeter in diameter, and then dried. Finally, a continuous outer layer of PVOH 112' is applied to the adhesive layer 114 and dried. The embodiment still has an adhesive layer that is subdivided into individual zones, each of which can be removed from the release coated backing sheet independently of one another. This overcomes the cohesive forces present in the adhesive layer, allowing the zones bearing the printed image to be transferred to the substrate while the zones not activated by ink jet printer ink remain on the assembly.

A presently preferred alternative version of the embodiment of FIG. 8 has a PVOH layer 142' that is continuous and that has a density of about 2 grams/m² (gsm). The next layer 114 consists of a very aggressive hydrophilic repulp adhesive that will be printed in dots 170 via gravure at a coat weight of around 35–45 grams/m². The outer layer 112' will be continuous and consist of a layer of non-tack repulp adhesive that is as thin as possible, preferably-less than 2 grams/m².

Figure 9:
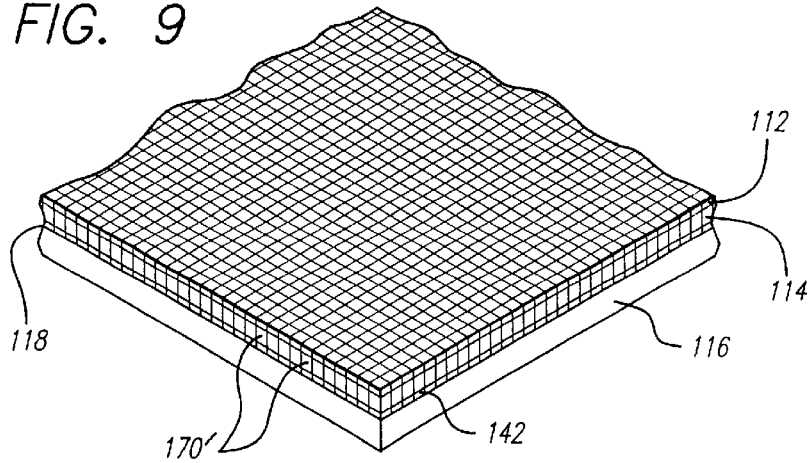
FIG. 9 shows an alternative embodiment that is similar to the embodiment of FIG. 7, except that the discrete zones are defined by score lines or die cuts.

FIG. 9 shows an alternative to the embodiment of FIG. 7, in that the PVOH layers 112 and 142, and the adhesive layer 114 are initially applied in continuous layers. The PVOH and adhesive layers are then divided into discrete zones 170 by way of score lines, die cuts, or other lines of weakness.

To use the assembly, the user feeds the assembly into an ink-jet printer, which prints a pattern onto the PVOH layer 112. Most of the ink passes through the non-tack PVOH layer 112 and into the ink-absorbent, repulpable adhesive layer 114. The liquid ink activates the adhesive, making the adhesive tacky in the area of the printed pattern.

Figure 10:
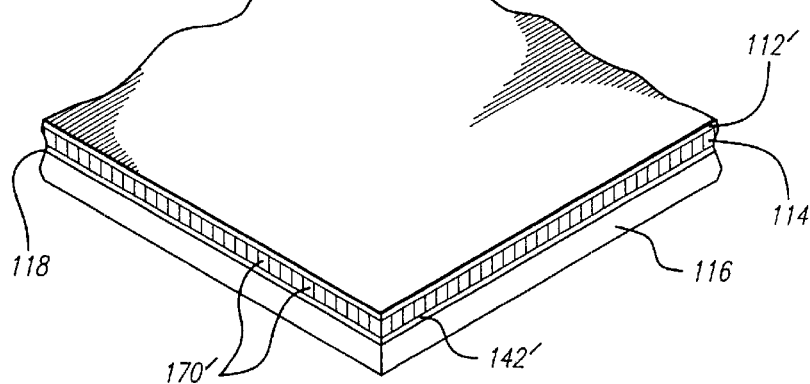
FIG. 10 shows an alternative embodiment that is similar to the embodiment of FIG. 9, except that the upper and lower layers are continuous.

FIG. 10 shows an alternative to the embodiment of FIG. 8, in that the adhesive layer 114 is first applied as a continuous layer rather than in dots. The continuous adhesive layer is then divided into discrete zones 170 by way of score lines, die cuts, or other lines of weakness. The upper and lower layers 142' and 112', respectively, are both continuous layers.

Figure 11:
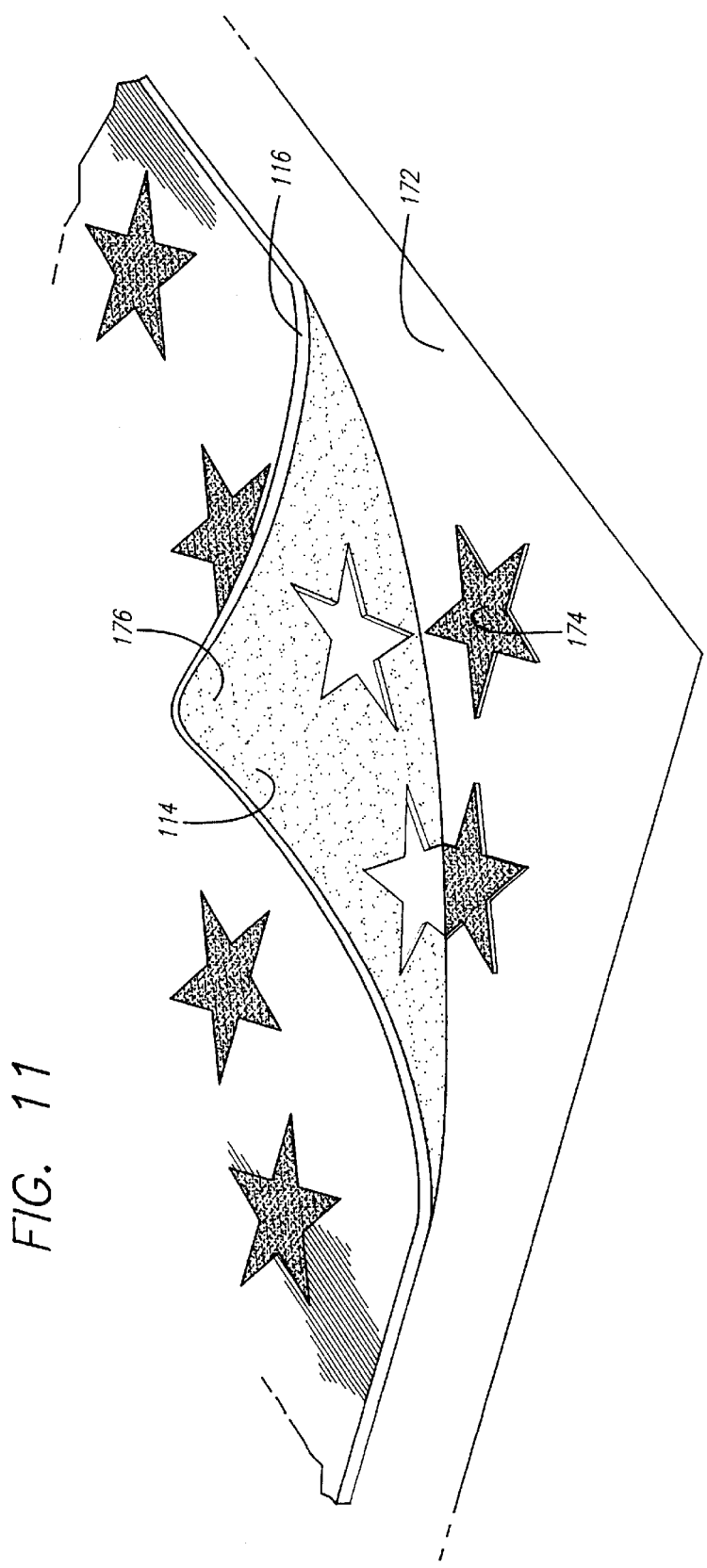
FIG. 11 illustrates a version of the embodiments of FIGS. 7–10 having a transparent substrate for purposes of illustration, in which discrete zones of the assembly bearing the ink that defines star images adhere to the image-receiving surface, while discrete zones of the assembly that do not bear the ink do not adhere to the image-receiving surface.

Turning now to FIG. 11, after printing the user presses the sheet onto an image-receiving surface 172, then peels away the release-coated substrate 116. The lines of weakening (not shown) in the adhesive layer 114 permit the now-tacky portions 174 of the adhesive to remain on the surface, along with the corresponding portions of the PVOH layers 112 and 142 (not shown, but, see FIG. 7). However, the portions of the adhesive 176 that do not bear the printed image, along with the corresponding portions of the PVOH layers 112 and 142, will not stick to the image-receiving surface because the areas of the adhesive 176 outside of the printed pattern do not become tacky.

Figure 12:
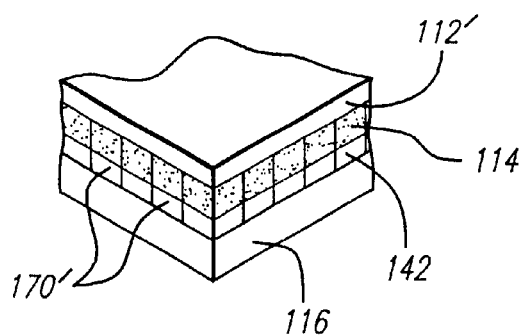
FIG. 12 is an alternative embodiment having a continuous upper face, and having a layer in between the adhesive and the substrate that serves to protect the image-bearing zones of adhesive after transfer to the image-receiving surface.

Referring to FIG. 12, it is preferred that the outer layer of PVOH, which forms the upper face of the assembly, is applied in a flat, continuous coating 112'. Otherwise, the ink jet printer ink will tend to seep through the outer PVOH layer at boundaries of the dots or at the lines of weakness, giving the printed pattern a hatched, jagged appearance. The image quality is significantly improved by having a continuous upper face 112', which may also be called an outer layer, so that the lines of the printed pattern may seep through unimpaired to the adhesive layer.

Figure 13:
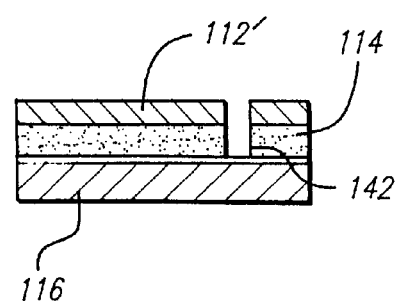
FIG. 13 is a detail view of the embodiment of FIG. 12, after an ink jet printer has printed an image into the adhesive, and after a user has first applied the upper face of the printed assembly to an image-receiving surface and then has removed the assembly from the image-receiving surface, thereby leaving on the surface the discrete zones that bear the image, but leaving on the assembly the zones of adhesive that do not bear the image.

FIG. 13 shows that even when the upper face 112' is continuous rather than separated into zones, only the portions of the upper face 112' that are directly adjacent to the image-bearing zones of adhesive will transfer to the image-receiving surface. That is, the upper face 112' is thin and weak, and it does not prevent the adhesive from separating from the assembly in zones. Furthermore, the liquid ink jet printer ink activates the image-bearing zones of adhesive, which adhere to the image-receiving surface despite the non-tack upper face 112'.

The bottom layer of PVOH 142' is a non-tack layer that prevents dust and other particles from attaching to the tacky adhesive layer. So, for instance, the user may transfer an ink-jet printed image from the assembly to the outer surface of a three-ring binder, which is frequently stored against other binders and/or books and papers. The non-tack PVOH surface prevents the image from sticking to the other binders and/or books and papers.

The bottom layer of PVOH 142 also serves to protect the printed image from being easily rubbed off. The PVOH is water soluble, such that the user may wash the image off of the image-receiving surface 172, if desired.

However, instead of using a PVOH layer 142 between the adhesive and the substrate, a layer of water-resistant compound, such as an acrylic or other material, can be used to repel water. This can be useful in protecting the image-bearing adhesive layer from liquid spills, rain and so on. Alternatively, a high gloss compound may be used in place of the PVOH layer 142 in order to give the image a high gloss.

Figure 14:
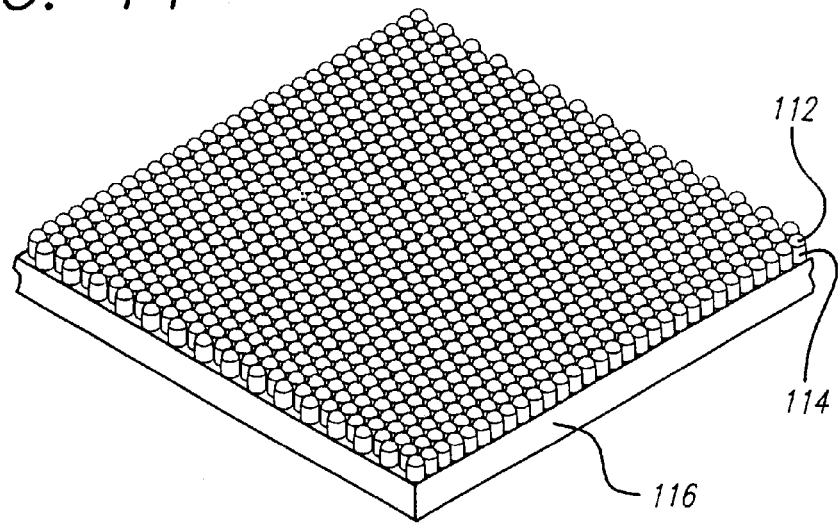
FIG. 14 is an alternative embodiment similar to the embodiment of FIG. 7, except that there is no non-tack layer in between the adhesive layer and the substrate.

FIG. 14 shows a further alternative embodiment of the discrete-zone type of assembly, in which there is no bottom non-tack layer 142. The embodiment of FIG. 14 is not presently preferred, as there is no layer to protect the image-bearing zones of adhesive once the adhesive is applied to a surface. However, this embodiment may be less expensive to manufacture, since there is one less layer of PVOH, and the construction may be useful in certain applications.

Ideally, the discrete zones of the embodiments of FIGS. 7–14 will be as small as possible. For example, the diameter of the dots of FIG. 7 will typically be ½ mil or less. Similarly, the lines or boundaries forming the fine grid of FIG. 9 will typically be spaced d mil or less from one another. However, the dots must be properly sized in order to maintain a sufficient adhesive density. Tests have found that the image quality is very unsatisfactory when the adhesive is less than 10 grams per square meter; marginally satisfactory at 20 grams per square meter; and excellent at 35 grams per square meter. So, as a practical matter, the density of the adhesive should be at least 10 grams per square meter, and preferably 25–35 grams per square meter.

The substrate 116 is typically polystyrene. Alternatively, a polyester layer such as Mylar™ may be used, although polyester is currently more expensive than polystyrene. Polystyrene also tends to perform better in ink jet printers. The substrate may also be clear as, for instance, in the embodiment of FIG. 11.

Yet another embodiment employs a detackifying layer 112 other than PVOH, such as finely divided particles uniformly dispersed on and bonded to the surface of the tacky adhesive layer. Examples of such particles are cellulose particles and dextrin particles. It is presently preferred that the finely divided particles have the shape of round spheres as is the case with starch particles (e.g. corn or potato starch) and powdered polyvinyl alcohol. As a further alternative to PVOH layer 112, a porous screen material, such as a cheese cloth, or a fine open mesh, may be used.

Figure 15:
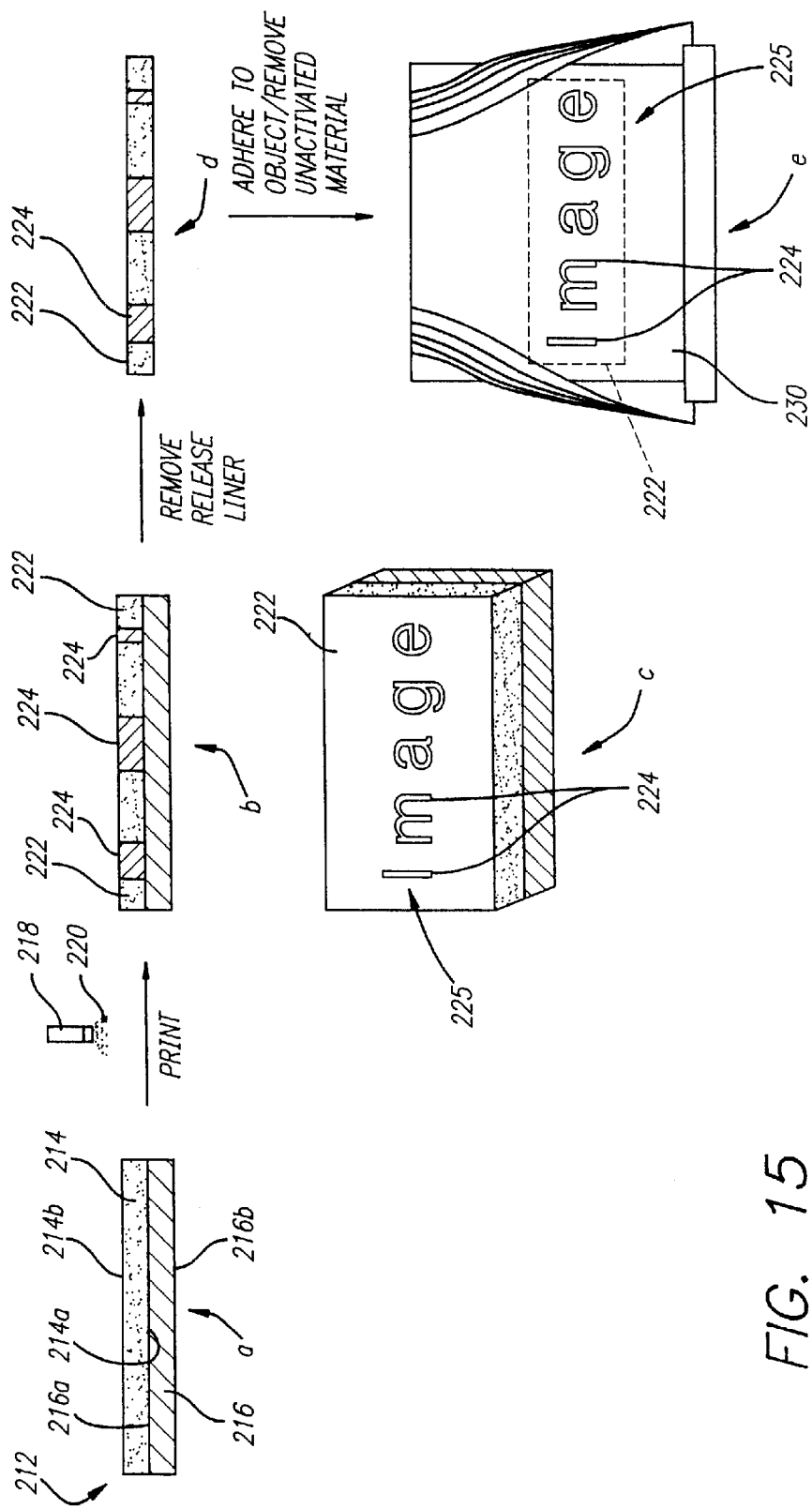
FIG. 15 is a schematic illustration of the configuration and use of one embodiment of an ink jet-imprintable, water-activated construction prepared in accordance with the present invention.
Figure 16:
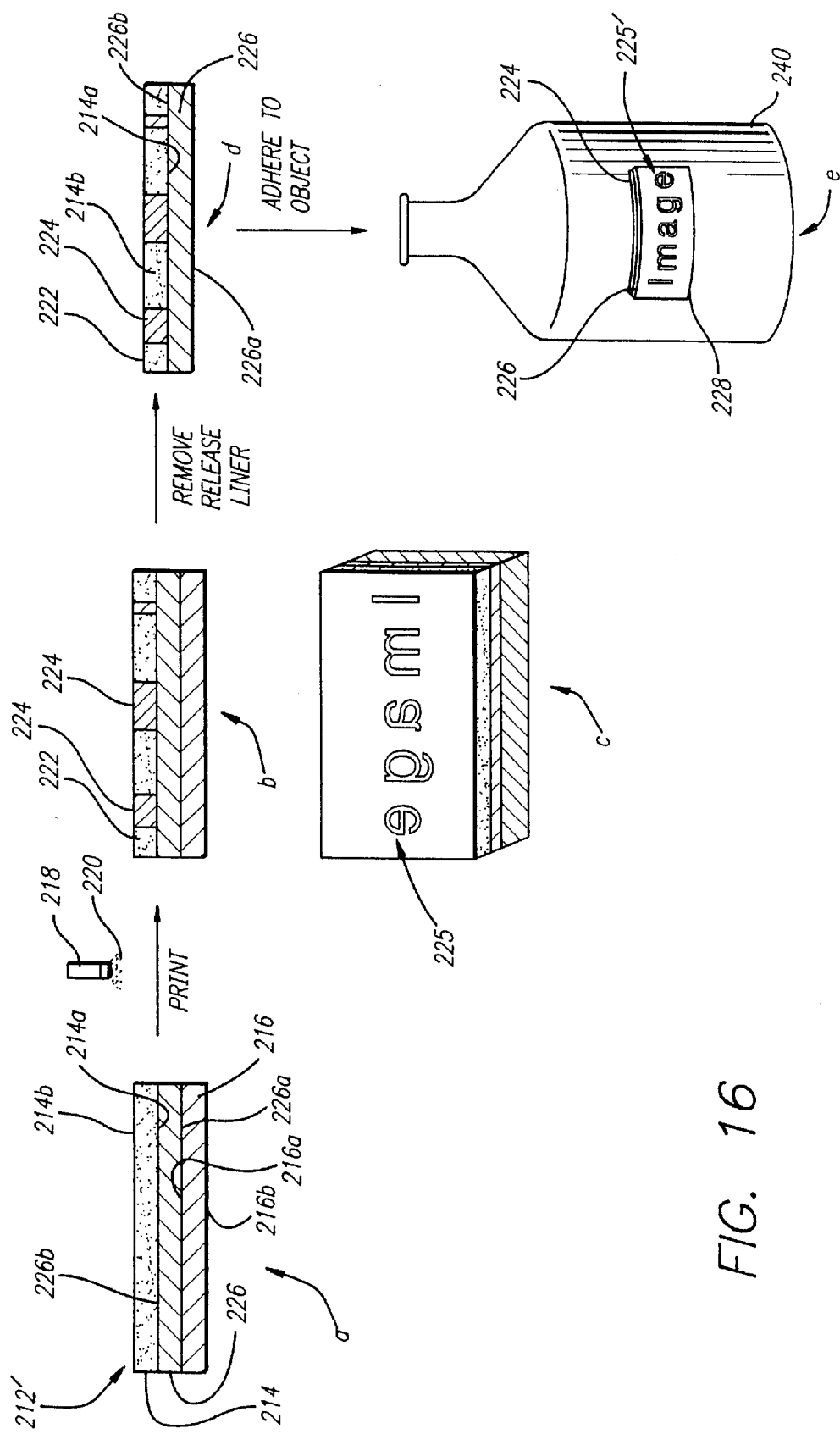
FIG. 16 is a schematic illustration of the configuration and use of a second embodiment of an ink jet-imprintable, water-activated construction prepared in accordance with the present invention.

FIGS. 15 and 16 are schematic illustrations of the configuration and use of two different embodiments of an imprintable, water-activatable adhesive construction prepared in accordance with the present invention. Referring to FIG. 15(a), an imprintable adhesive construction 212 includes a layer of water-activatable polymer 214 coated on or otherwise applied to a release liner 216. The polymer layer 214 has an inner face 214a and an outer face 214b, and preferably comprises a water-activated acrylic emulsion polymer as described above. The polymer layer is non-tacky when dry, but hydrophilic, water-activatable, and ink absorbent—i.e., imprintable. Alternatively, the polymer layer 214 is some other water-activated material, such as a mixture of approximately 75% polyvinyl alcohol (PVOH) and 25% polyacrylic acid. In each case, the polymer is applied to the release liner in a conventional manner, then dried to form a thin film-like layer 214.

The release liner 216 has a conventional nature and may comprise, for example, a paper or other flexible plastic backing, such as a Mylar™ film, coated with a release material, such as polydimethylsiloxane, another silicone, or a non-silicone material, such as polyvinyl octadecyl carbamate. Alternatively, the release liner can comprise a film of inherently releasable material. Some polymer films have a sufficiently low shear modulus to be useful as release liners without the use of a release coating. (See, for example, U.S. Pat. No. 4,339,485 which is incorporated herein by reference. The release liner 216 has an inner or "front" face 216a (sometimes called the "release face") and an outer or "back" face 216b.

It will be appreciated that the thicknesses of the respective layers 214 and 216 are grossly exaggerated in the figures. In practice, the constructions may be prepared as thin sheets or rolls, like a sheet of labels where, for example, the polymer layer 214 has a thickness of between 0.5 and 2 mils, and the release liner or other release carrier has a similar small dimensional thickness.

When the construction 212 is dry, it is non-tacky. However, it is both hydrophilic and water-activatable, the latter meaning it becomes tacky when exposed to water— even a small amount of moisture, such as the water in a water-based ink. In FIG. 15, water-based ink 220 is ejected from a printer port 218 and forms a printed image 225 on the outer face 214b at the polymer layer. The water in the ink activates the polymer making it tacky within the region of the printed image. This is shown in FIG. 15(b), where a cross-sectional view of the construction is depicted, and in FIG. 15(c), where a perspective view of the printed construction is shown. The parts of the polymer layer not exposed to ink remain untacky, and are designated as non-tacky or nonactivated regions 222. The formation of printed image 225 causes tacky regions 224 to form in the polymer layer. Because the polymer layer 214 is both thin and hydrophilic, it becomes activated across its entire cross-sectional thickness, from the outer face 214b to the inner face 214a. Thus, although printed on its outer face, it becomes tacky all the way through to the inner face.

The printed image 225 can be transferred directly to an object by simply removing the release liner and pressing the delaminated construction (which now consists of the adhesive layer 214 only) onto a surface, such as the window 230 depicted in FIG. 15(e). Alternatively, the release liner can be removed after the adhesive layer is adhered to a surface or object. In one embodiment, only the imaged (printed) region becomes affixed to the object, that is, the water-activated regions 224 of the polymer layer (which are essentially coextensive with the imaged region) adhere to the object, and the remaining, nonactivated (non-tacky) regions 222 of the polymer layer can be easily pulled away and discarded. The effect is similar to application of a die-cut label, but appears to the eye as a "label-less" printing on the object or substrate. This can result, for example, from the intrinsic internal cohesiveness of the polymer, and/or the manner in which the adhesive was applied to the release liner.

In one embodiment, the polymer simply has an internal cohesiveness or integrity which is sufficiently low to afford easy detachability of nonactivated regions from activated regions. This has been observed, for example, in constructions made with a formulation that includes methyl methacrylate in the polymer backbone, such as Examples 1A–1H and 2, above. Unexpectedly, the presence of methyl methacrylate in the monomer composition appears to improve the clear break between activated and nonactivated regions of the polymer during image transfer, allowing the nonactivated regions to remain attached to the flexible substrate or liner, or simply discarded. Alternatively, if the construction 212 is formed by applying the polymer 214 to the release liner 216 as a micro array of slightly separated droplets or dots, it is easy to strip the nonactivated regions 222 from the activated regions.

In another embodiment (shown in phantom in FIG. 15(e)), the nonactivated regions 222 of the adhesive layer remain attached to the activated regions 224 (which are coextensive with the image). The image 225 is adhered to the object by the activated adhesive regions 224, but the nonactivated regions 222 remain secured as well, though not adhesively bound to the object.

Once applied to a surface, the adhesive forms a high peel strength bond. Yet, because the adhesive is water-dispersible, repulpable and hydrophilic, it can be easily removed by application of water.

Referring now to FIG. 16, a schematic illustration of a different configuration of an imprintable, water-activated construction, and its use, is depicted. The construction 212' is similar in many ways to construction 212 of FIG. 15, and similar components are numbered as in FIG. 15. In the construction 212' of FIG. 16, however, there is also provided a layer of water insoluble or water-resistant material 226, having an inner face 226a and an outer face 226b, sandwiched between the layer of water-activatable polymer 214 and release liner 216. This construction is similar in most respects to that shown in FIG. 15, and its components have, for example, similar small dimensional thicknesses.

The water-resistant layer 226 can be opaque but, more preferably, is transparent, and can be formed, for example, of a polymeric material, such as Mylar™, or a similar flexible, durable, water insoluble material. Multilayer construction 212' is prepared in a conventional manner, for example, by laminating a release liner 216 to a water-resistant layer 226, and coating an adhesive layer 214 onto the outer face 226b of the water-resistant layer 226. The water insoluble, transparent film layer can even be used in place of the release liner, in some embodiments. As in the embodiment depicted in FIG. 15, when the adhesive construction 212' is dry, it is non-tacky. However, when exposed to even a small amount of moisture, such as the water in a water-based ink, the polymer layer 214 becomes tacky (pressure-sensitive). Thus, it can be printed on and activated in the same manner as described above and shown in FIG. 15. In many embodiments, however, it is advantageous to print the image in reverse (as shown in FIG. 16(c)), for reasons that will now be described.

After the image is printed onto the construction, the release liner may be removed and the remaining two-layer sandwich can be adhered to an object. In those embodiments where the water-resistant layer 226 is transparent, the importance of reverse printing becomes apparent. As shown in FIG. 16(e), a printed image construction 228 is adhesively attached to a bottle 240, with the activated regions 224 of the polymer layer in direct contact with the bottle, and the water-resistant layer 226 outwardly disposed therefrom. The image 225' is visible through, and protected by, the transparent water-resistant layer 226. Had the image not been reverse printed, it would appear to be "backwards" once the printed image construction 228 was attached to the bottle, at least from the perspective of viewing it directly, rather than through the bottle. Reverse image printing corrects this problem. Software for reversing the image of both text and pictures is commercially available from Adobe, under the mark Photo Deluxe. Image reversing share ware, such as "L-View," can be downloaded from the internet.

The present invention has been described and illustrated in several examples and embodiments, but is not limited thereto. A person having ordinary skill in the art to which this invention pertains will appreciate that variation and modification of the compositions, materials, dimensions and other elements recited herein can be practiced without departing from the invention. For example, the ink receptivity of the adhesive can be enhanced by coating a thin (0.1 to 0.3 micron) layer of polyvinyl alcohol, poly-hydroxyethyl methacrylate (p-HEMA), or similar hydrophilic polymer on the outer face 214b of the adhesive layer. (If p-HEMA is employed, it should be applied as a dilute—less than 5%—solution, to avoid incompatibility with the emulsion polymers.) Such a coating, when dry, also provides a protective layer for the construction, particularly if the construction is self-wound.

A PVOH-coated, self-wound construction has been prepared, using biaxially oriented polypropylene (BOPP) as both a transparent, water insoluble film layer and a release liner, and the acrylic polymer corresponding to 1E, above. More particularly, a 50 micron thick BOPP film, having a high energy side (38 dyne/cm surface tension) and a low energy side (32 dyne/cm surface tension) was coated with the adhesive, at a coat weight of 25 grams per square meter ($g/m^2$) or, approximately 25 microns thick.

Two samples (I and II) were prepared by coating the low surface energy side of the BOPP film with acrylic polymer. The high energy surface energy side (the "back" side) was corona treated and coated with a thin (<0.1 microns thick) layer of polyvinyl octadecyl carbamate (PVODC), a non-silicone release material. Specifically, polyvinyl octadecyl carbamate, (PVODC), a non-silicone release material. Alternatively, other release materials can be used. After the acrylic polymer was dried, Sample I was coated with a thin layer of PVOH, having a solids content of 1%, at a coat weight of less than 0.24 $g/m^2$. Sample II was coated with a thin layer of PVOH having a solids content of 3%, at a coat weight of less than 0.12 $g/m^2$.

Two other samples (III and IV) were prepared by coating the acrylic polymer on the high surface energy side of the BOPP film. No release coating was needed on the back side of the BOPP film, due to its low surface energy. After the polymer was dried, Sample III was coated with 3% solids PVOH (<0.24 $g/m^2$ coat weight), and Sample IV was coated with 1.5% solids PVOH (<0.12 $g/m^2$ coat weight).

All four samples were fed through an ink jet printer and imaged directly on the PVOH surface. Due to ink absorption through the PVOH and water-activatable polymer layers, the polymer became tacky, and the image could be transferred to a substrate as a "label-less" label, separated from the non-imaged part. The transparent, water insoluble BOPP film protects the image while allowing it to be viewed when adhered to a substrate.

It will be appreciated that this aspect of the invention is not limited to constructions made with biaxially oriented polypropylene, but has a broader scope that encompasses polymeric films in general, preferably transparent, water insoluble films, including other polyolefins, polyesters, polystyrenes, and the like. All such films have a front side and a back side. The relative surface energy of the two sides may be equal or unequal, i.e., a given film may have a low energy side and a high energy side. Similarly, other release coatings may be used in place of polyvinyl octadecyl carbamate. Such coatings are known in the art, and include silicones and other materials.

In some embodiments, it is advantages to score or die cut the release liner and/or the water insoluble layer, in which case removal (delamination) of the release liner from the adhesive becomes unnecessary.

Various further modifications and changes may be employed without departing from the spirit and scope of the invention. Thus, as described hereinabove, instead of using hydrophilic or repulpable adhesives, hydrophobic pressure sensitive adhesives, or heat activated, or water activated adhesives, may be employed as the imaging layer, with appropriate ink solvents so that the ink will penetrate this imaging adhesive layer.

Also, instead of Mylar, other transparent plastic or opaque layers may be employed as the support layer. For the outer detackifying layer, a very fine metallic or cloth mesh with an open weave may be employed; and other substances having comparable properties may be substituted for those mentioned hereinabove. It is also noted that the ink jet absorbing layer may be detackified relative to the ink jet printer by applying strips of paper with a silicone coating facing the adhesive, and with the longitudinally extending strips of paper matched to the spacing of the drive wheels of the ink jet printer; and the adhesive layer may be fully activated following application of an ink jet image to areas of the adhesive layer not covered by the strips, by peeling off the strips.

Furthermore, the present invention is not limited to use with ink-jet printers, but may be utilized with similar printers and inks. Other methods of infusing an ink-absorbent adhesive layer with a liquid ink to define an image, with the liquid ink passing through a non-tack layer on its way to the adhesive layer, may be employed. For example, a user could draw an image directly onto the image transfer assembly using a felt-tip or other pen filled with a water-based ink of the type used in ink jet printers. Consequently, the term "ink jet printer" is not strictly limited to ink jet printers, but encompasses other methods of printing that utilize ink jet printer-type ink.

A further application of the embodiment of FIGS. 7–14 is as a replacement for double-sided adhesive tape. For example, suppose someone wants to adhere a star-shaped object onto a window. A typical way to stick the star-shaped object onto the window is with strips of double-sided tape. However, this approach can be troublesome because the tape comes in strips rather than in a star shape. The user could cut the strips with scissors to form a star shape, or could carefully place several strips of different lengths adjacent to one another to approximate a star shape, but either of these approaches is time consuming and often frustrating.

To prevent such frustration, the user may instead print a star shape onto one of the embodiments illustrated in FIGS. 7–14. The user can transfer the star shape onto the window as in FIG. 11. While the ink that defines the star remains wet, the exterior surface of the star will be sticky. The user can then use the star as she would use double sided tape, and adhere the star-shaped object directly onto the star image.

As an alternative to the embodiments in which the adhesive is scored or die cut, tiny glass beads may be added to the adhesive layer. The adhesive typically has very high cohesion, and the glass beads serve to break up the cohesion into small zones by creating voids where there is no adhesive. Consequently, when the user applies the freshly printed adhesive to a substrate, only the printed areas of the adhesive will adhere to the substrate. As the user pulls the backing sheet away from the substrate, the glass beads allow the printed adhesive to break cleanly away from the unprinted adhesive, leaving only the printed adhesive on the substrate. The glass beads will typically be within the range of 100 microns to ½ mil in diameter, and perhaps even smaller. Other types of small particles, such as starch, salts and/or other particles, may be employed rather than glass particles.

Accordingly, the present invention is not limited precisely to the arrangements as shown in the drawings and as described in detail hereinabove.

It should also be understood that the figures are not production drawings, but are intended to illustrate concepts, and the relative dimensions in the figures do not necessarily correspond to the actual relative dimensions. Additionally, words such as "upper," "lower," "inner," and "outer" are used for the purpose of illustrating the relative position of one component with respect to another. However, in use, the assembly is moved about, and what is illustrated as "upper" in the figures may actually have a different orientation at a particular moment in time. Consequently, relative terms are to be understood in a relative sense rather than in an absolute sense.

What is claimed is:

1. An image transfer sheet for use with ink jet printers, the sheet having an adhesive layer for receiving liquid ink jet printer ink and retaining an image printed by an ink jet printer, the sheet comprising:
   a flexible base layer;
   an image holding ink jet printing ink absorbing, water-activatable adhesive layer coated onto a base layer;
   an ink jet printing ink porous non-adhesive detackifying outer layer, said porous layer permitting ink jet printing ink to pass through the porous layer into said adhesive layer; said layer being inactivatable; and
   said image transfer sheet further comprising a release coating between said flexible base layer and said adhesive layer.

2. An image transfer sheet having an adhesive layer that is adapted to receive and retain an image printed by an ink jet printer, the sheet comprising:
   a release coated flexible base layer which is non-porous to ink jet printing inks;
   an ink jet printing ink absorbing, water-activatable adhesive layer coated onto said base layer;
   an ink jet printing ink porous detackifying outer layer, said porous layer permitting ink jet printing ink to pass through the porous layer into said adhesive layer; said layer being inactivatable; and
   wherein said porous detackifying outer layer is located over the adhesive layer, said porous layer being formed of uniformly divided particles uniformly dispersed on said adhesive layer; and
   wherein said ink absorbing adhesive layer is water retaining.

3. An image transfer sheet according to claim 2, wherein said particles are round spheres.

4. An image transfer sheet according to claim 2, wherein said particles have the same refractive index as the adhesive layer.

5. An image transfer sheet according to claim 4, wherein said particles are starch particles or polyvinyl alcohol particles.

6. An image transfer assembly for transferring an image that is printed on the assembly onto an image-receiving surface, comprising:
   a release coated flexible substrate;
   an upper surface that is substantially permeable to ink jet printer ink and that is non-tacky prior to printing; and
   an image holding water-activatable adhesive layer that absorbs ink jet printer ink, said adhesive being in between said upper surface and said flexible substrate, said adhesive layer comprising discrete zones and boundaries, such that said discrete zones may be separated from one another along said boundaries;
   said assembly having a first, pre-printed mode in which said upper surface is non-tacky at room temperature prior to printing, and a second, printed mode immediately after printing in which only those zones of said upper surface that are printed are activated and tacky, whereas zones of said upper surface that are free of printing are not activated and are non-tacky;
   wherein a user may print an image into said adhesive layer with an ink jet printer and then apply said upper surface to the image-receiving surface, thereby leaving the discrete zones of the adhesive layer that bear said printed image on the image-receiving surface, but leaving other zones of said adhesive layer on said assembly; and
   wherein said ink absorbing adhesive layer is water retaining.

7. An image transfer assembly as defined in claim 6, wherein said upper surface comprises a thin layer of PVOH.

8. An image transfer assembly as defined in claim 6, wherein said discrete zones of adhesive are printed dots of adhesive and said boundaries are edges of said dots.

9. An image transfer assembly as defined in claim 6, wherein said discrete zones of adhesive are defined by lines of weakness and wherein said boundaries are said lines of weakness.

10. An image transfer assembly as defined in claim 6, further comprising a non-tack layer in between said adhesive layer and said substrate, said non-tack layer serving to protect said adhesive layer once said adhesive layer has been transferred to an image-receiving surface.

11. An image transfer assembly as defined in claim 10, wherein said non-tack layer in between said adhesive layer and said substrate is hydrophobic.

12. An image transfer assembly as defined in claim 10, wherein said non-tack layer in between said adhesive layer and said substrate is PVOH.

13. An image transfer assembly as defined in claim 6, wherein said upper surface is substantially continuous.

14. An image transfer assembly as defined in claim 6, wherein said adhesive layer has a density of approximately 20–35 grams per square meter.

15. An image transfer assembly as defined in claim 6, wherein said boundaries are arranged in a fine grid pattern.

16. An image transfer assembly as defined in claim 15, wherein said adhesive is hydrophilic.

17. An ink jet image transfer sheet having an adhesive layer for receiving and retaining an image printed by an ink jet printer, the sheet comprising:
   a first, liquid-ink permeable detackifying layer forming a printing surface of said sheet; said layer being inactivatable;
   a liquid ink-absorbing, image holding adhesive layer that is activatable by liquid ink underlying said first detackifying layer;
   a second detackifying layer underlying said liquid ink-absorbing adhesive layer;
   a flexible, non-porous backing sheet underlying said second detackifying layer, said first detackifying layer permitting at least a portion of liquid ink that is printed on said first layer to pass through to said adhesive layer; and
   a release coating between said backing sheet and said second detackifying layer.

18. An ink jet image transfer sheet as defined in claim 17, wherein said adhesive layer is hydrophilic.

19. An ink jet image transfer sheet as defined in claim 17, wherein said adhesive layer is a pressure-sensitive adhesive.

20. An ink jet image transfer sheet as defined in claim 17, wherein said first, liquid-ink permeable detackifying layer is water permeable.

21. An ink jet image transfer sheet as defined in claim 17, wherein said flexible, non-porous backing sheet is transparent.

22. An ink jet image transfer sheet as defined in claim 17, wherein said first, liquid-ink permeable detackifying layer comprises polyvinyl alcohol.

23. An ink jet image transfer sheet as defined in claim 17, wherein said second detackifying layer is a high-gloss layer.

24. An ink jet image transfer sheet as defined in claim 17, wherein said second detackifying layer is hydrophobic.

25. An ink jet image transfer sheet as defined in claim 17, wherein said adhesive layer has a density of approximately 20–35 grams per square meter.

26. An ink jet image transfer method comprising the steps of:
   (a) forming an image transfer sheet as defined in claim 17;
   (b) feeding the sheet with its detackified printing surface into the ink jet printer;
   (c) printing an image with the ink jet printer on the printing surface and at least partially into the adhesive layer to tackify the printing surface where the image has been printed, said image forming a tackified printed portion of said image transfer sheet;
   (d) after printing the image, adhering the printed portion of said image transfer sheet to a substrate by applying the printing surface to the substrate; and
   (e) after adhering the printed portion of said image transfer sheet to a substrate, peeling said backing sheet from the printed portion and the substrate, thereby leaving said printed portion of said image transfer sheet adhered to said substrate, at least a portion of said second detackifying layer covering a surface of said printed portion of said image transfer sheet after said backing sheet has been peeled off.

27. An ink jet image transfer sheet having an adhesive layer for receiving and retaining an image printed by an ink jet printer, the sheet comprising:
   a first, liquid-ink permeable detackifying layer that is water permeable forming a printing surface of said sheet; said layer being inactivatable;
   a liquid ink-absorbing, hydrophilic, pressure-sensitive adhesive layer underlying said first detackifying layer;
   a second detackifying layer that is hydrophobic underlying said liquid ink-absorbing adhesive layer;
   a flexible, non-porous backing sheet underlying said second detackifying layer, said first detackifying layer permitting at least most liquid ink that is printed on said first layer to pass through to said adhesive layer; and
   a release coating between said backing sheet and said second detackifying layer.

28. An ink jet image transfer sheet having a water-activatable adhesive layer for receiving and retaining an image printed by an ink jet printer comprising:
   a polymer formed from a mixture of monomers comprising, based on the total weight of monomers,
      (a) from about 40 to 70% by weight of one or more alkyl acrylates, the alkyl group of which has from about 4 to about 7 carbon atoms;
      (b) from about 10 to about 20 percent by weight of methyl acrylate;
      (c) from about 2 to about 15 percent by weight of vinyl acetate;
      (d) from about 10 to about 25 percent by weight of methacrylic acid, acrylic acid, or a mixture of methacrylic and acrylic acid; and
      (e) a positive amount up to about 30 percent by weight, of methyl methacrylate; said polymer being non-tacky at room temperature when dry, but tacky when wet;
   a base layer; and
   said polymer being supported by the base layer.

29. A composition as recited 28, wherein the monomer mixture further comprises a positive amount up to about 5 percent by weight, based on the total weight of monomers, of a hydroxyalkyl methacrylate.

30. A composition as recited in claim 29, wherein the hydroxyalkyl methacrylate comprises hydroxyethyl methacrylate.

31. A composition as recited in claim 28, wherein the alkyl acrylate is selected from the group consisting of butyl acrylate, ethylhexyl acrylate, isooctyl acrylate, and mixtures thereof.

\* \* \* \* \*